(No Model.)

E. L. CUSHING.
SUPPOSITORY MOLD.

No. 448,133. Patented Mar. 10, 1891.

WITNESSES
Stephen F. Maroney
Frank F. A. Schiller

INVENTOR
Enos L. Cushing.
by John J. Halsted & Son
his Attys.

UNITED STATES PATENT OFFICE.

ENOS L. CUSHING, OF ALBION, NEW YORK.

SUPPOSITORY-MOLD.

SPECIFICATION forming part of Letters Patent No. 448,133, dated March 10, 1891.

Application filed June 2, 1890. Serial No. 353,986. (No model.)

*To all whom it may concern:*

Be it known that I, ENOS L. CUSHING, of Albion, in the county of Orleans and State of New York, have invented certain new and useful improvements in a new and improved method of and apparatus for making suppositories, bougies, and similar articles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to furnish a new and improved and simple apparatus for making suppositories, bougies, and similar articles.

To this end my invention consists, first, of two crossed levers having a common center like a pair of pinchers and a longitudinally-divided mold of the required form, one section of the mold being connected with one arm of each lever and the other arms of the levers forming handles for opening and closing the mold, and one of said sections being provided with a lip surrounding and extending from the same and adapted to overlap the other section; second, of a separate lever connected with the other two levers and having one of its arms adapted to swing over one end of the mold for assisting the packing of the material in the same and for smoothing off one end of the molded form, and having a transverse perforation for the discharge of the surplus material; and my invention also consists in certain details of construction, all as more particularly hereinafter described.

Figure 1:
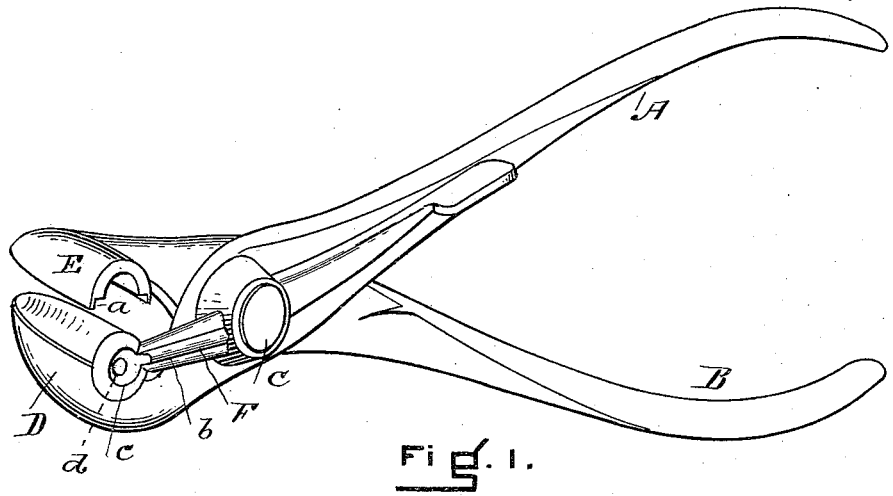
Figure 2:
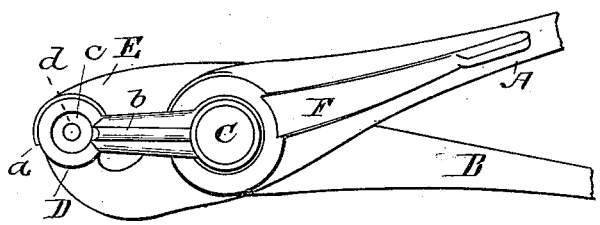
Figure 3:
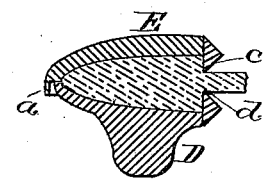
Figure 4:
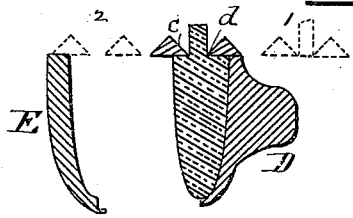
Figure 5:
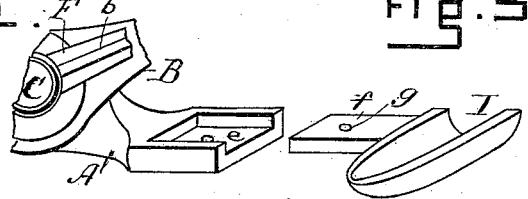
Figure 7:
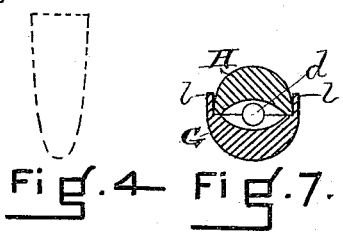
Figure 7:
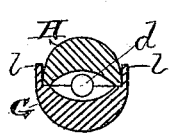
Figure 8:
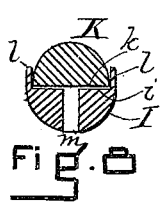
Figure 6:
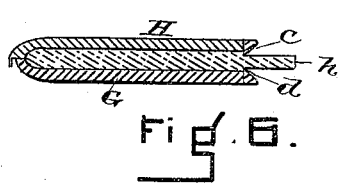

Figure 1 is a perspective view of my improved device, showing the position of the parts in the first position of molding, the mold being of a form suitable for making suppositories. Fig. 2 is a side elevation showing the mold closed upon the material with the latter formed therein. Fig. 3 is a sectional detail showing the material inclosed in the mold. Fig. 4 is a sectional detail showing the operation of smoothing the bottom of the suppository and discharging the same. Fig. 5 illustrates my device as made with removable molds. Figs. 6, 7, and 8 illustrate different forms of my device as applicable for making bougies.

A and B represent the handles of two crossed levers of the first class, and C is the common fulcrum or pivot which connects said levers like a pair of pinchers. The shorter arms of the above-stated levers terminate in two sections D and E of a longitudinally-divided conical mold, the length of which is transverse to the levers and substantially parallel with the pivot C and having its base open. The section E of the mold is provided with a flange or lip a, extending beyond its longitudinally-connecting edge and adapted to overlap the corresponding edge of the section D in order to insure a better connection of the two parts of the mold and to insure the taking up of sufficient material.

F is a short lever fulcrumed upon the pivot C, with one arm b adapted to extend and swing over the open base of the mold D E and its other arm extending down along the handle A. The outer portion of the lever F, which is adapted to cover the base of the mold, has a conical transverse countersink c, which terminates in a hole d.

The operation is as follows: The apparatus being in the position shown in Fig. 1, with the jaws and sections C D of the mold apart and the outer end of the lever F over the base of the section C, the material to be molded is then pinched between said jaws and sections by bringing the handles A and B together. The material will by this operation be packed in the mold with the outer portion of the lever F binding against the base of the molded form and assisting in packing the same and preventing its squeezing out too much at this place. (See Figs. 2 and 3.) The jaws and sections C D of the mold are then separated by the handles A B, leaving the molded material in the section D. (See Fig. 4.) The outer end of the lever F is then swung to the left, (see dotted lines 1,) thus smoothing off the base of the molded material by the plane inner surface of the lever F. Then by swinging the lever F across the molded form in the opposite direction (see dotted lines 2, Fig. 4) 10 it will loosen the latter and allow it to drop from the mold.

In Fig. 5 I have shown the molds as being detachable from the cross-levers, this being for the purpose of using the same levers for molds of different sizes and forms. A recess e is formed upon the inner portion of the jaws or short arms G H of the cross-levers and each section of the die or mold provided with a longitudinal extension f to fit into the recesses e, and said extensions are held in the recesses by bolts or screws g, passing transversely through the same. The mold I K, Fig. 5, and the mold C D, Figs. 1, 2, 3, and 4, are conical in form and particularly adapted for making suppositories.

In Figs. 6 and 7 I have shown my device of a suitable form for making bougies. In this case the countersink c and hole d are on a plate fixed to one jaw G, and the two jaws G and H are adapted to come more closely together, and the material is then squeezed out of the hole d in the form of a rod h. In Fig. 6 the material is also molded into a bougie between the jaws.

In Fig. 8 the jaws I and K have plane squeezing-surfaces i and k, and the flange or lip l in this figure and in Fig. 7 is made somewhat wider than the lip a, as shown in the other figures, for the purpose of forming walls with which to inclose the material to be acted upon. In this figure, also, the hole m in Fig. 8 is directly through the jaw I and in the line of play of the jaw K, in order that all the material in the mold may be squeezed through the hole m.

What I claim as new, and desire to secure by Letters Patent, is—

1. The improved device for forming suppositories, bougies, and similar articles, consisting of two crossed levers of the first class, the shorter arm of each lever being provided with one section of a longitudinally-divided mold, which sections form jaws in which to pinch and mold the material, and one of said sections being provided with a lip surrounding and extending from the same and adapted to overlap the other section, all as set forth.

2. The improved device for forming suppositories, bougies, and similar articles, consisting of two crossed levers of the first class, the shorter arm of each lever being removable and provided with one section of a longitudinally-divided mold, which sections form jaws in which to pinch and mold the material, all as set forth.

3. The improved device for forming suppositories, bougies, and similar articles, consisting of two crossed levers of the first class, the shorter arm of each lever being provided with one section of a longitudinally-divided mold, which sections form jaws in which to pinch and mold the material, and one of said sections being provided with a lip surrounding and extending from the same and adapted to overlap the other section, and a lever connected with the other two levers and having one of its arms adapted to swing over the base of the mold, all as set forth.

4. The improved device for forming suppositories, bougies, and similar articles, consisting of two crossed levers of the first class, the shorter arm of each lever being provided with one section of a longitudinally-divided mold, which sections form jaws in which to pinch and mold the material, and one of said sections being provided with a lip surrounding and extending from the same and adapted to overlap the other section, and a lever connected with the other two levers, having one of its arms adapted to swing over the base of the mold and having the hole c for the escape of the surplus material, all as set forth.

5. The improved device for forming suppositories, bougies, and similar articles, consisting of two crossed levers of the first class, the shorter arms of the levers being provided with jaws, between which the material is adapted to be squeezed, and an outlet-opening from said jaws, and one of said jaws being provided with a lip surrounding and extending from the same and adapted to overlap the other jaw, all as set forth.

ENOS L. CUSHING.

Witnesses:
C. H. MOORE,
R. C. TOBIAS.